United States Patent [19]

Doniat et al.

[11] Patent Number: 5,100,748
[45] Date of Patent: Mar. 31, 1992

[54] STRUCTURE OF NICKEL HYDROXIDE-BASED ELECTRODE DOPED WITH COBALT FOR AN ELECTROCHEMICAL GENERATOR

[75] Inventors: Denis Doniat, Le Perreux; Bernard Bugnet, Champs-S/Marne, both of France

[73] Assignee: Sorapec Societe de Recherches et d'Applications Electrochimiques, Fontenay Sous-Bois, France

[21] Appl. No.: 636,559

[22] Filed: Jan. 7, 1991

Related U.S. Application Data

[63] Continuation of Ser. No. 549,560, Jul. 9, 1990, abandoned, which is a continuation of Ser. No. 453,030, Dec. 27, 1989, abandoned, which is a continuation of Ser. No. 268,669, Nov. 7, 1988, abandoned, which is a continuation of Ser. No. 82,220, Aug. 6, 1987, abandoned.

[30] Foreign Application Priority Data

Aug. 6, 1986 [FR] France ................................. 86 11395

[51] Int. Cl.⁵ ............................................ H01M 10/44
[52] U.S. Cl. ...................................... 429/223; 205/60
[58] Field of Search ......................... 429/223; 204/2.1

[56] References Cited

U.S. PATENT DOCUMENTS

| | | | |
|---|---|---|---|
| 3,507,699 | 4/1970 | Pell et al. | 204/2.1 |
| 4,330,603 | 5/1982 | Jackovitz et al. | 429/223 |
| 4,356,242 | 10/1982 | Doniat | 429/223 |
| 4,443,526 | 4/1984 | Jackovitz et al. | 429/223 |
| 4,595,463 | 6/1986 | Lee | 204/2.1 |

FOREIGN PATENT DOCUMENTS 2060241  4/1981  United Kingdom ................ 429/223

*Primary Examiner*—Brian E. Hearn
*Assistant Examiner*—Maria Nuzzolillo
*Attorney, Agent, or Firm*—Fleit, Jacobson, Cohn, Price, Holman & Stern

[57] ABSTRACT

The invention relates to a structure of a positive electrode possessing improved electrical capacity and intended for electrochemical generators working with a liquid electrolyte. It comprises, on the one hand, a metallic collector of high porosity, in particular of the non-woven fibrous type or of the isotropic, cross-linked type of open porosity and, on the other hand, a nickel hydroxide-based active material filling in part the pores of the collector and containing cobalt. This structure is characterized by a heterogeneous dispersion of the cobalt within the active material.

25 Claims, No Drawings

STRUCTURE OF NICKEL HYDROXIDE-BASED ELECTRODE DOPED WITH COBALT FOR AN ELECTROCHEMICAL GENERATOR

This application is a continuation of application Ser. No. 07/549,560, filed on July 9, 1990, now abandoned, which is a continuation of Ser. No. 07/453,030, filed on Dec. 27, 1989, now abandoned, which is a continuation of Ser. No. 07/268,669, filed on Nov. 7, 1988, which is a continuation of Ser. No. 082,220, filed on Aug. 6, 1987, now abandoned.

The present invention relates to the structure of a positive electrode base on nickel hydroxide and possessing an improved current-carrying capacity. A positive electrode with this type of structure can be used for the assembly of electrochemical generators using liquid electrolyte, for example those of the nickel-cadmium type.

The invention relates more especially to an improved electrode structure derived from the structure described in U.S. Pat. No. 4,356,242.

Even then this patent was more especially concerned by the description of the structure of a positive electrode comprising, on the one hand, a porous fibrous support of open porosity forming and/or supporting a metallic current collector, made of nickel in particular and inert with respect to the electrochemical reactions necessarily occurring in the cycles of charge-discharge of the generator and, on the other, a nickel hydroxide-based active material partially filling the pores of the collector.

The earlier patent also described a process for manufacturing such an electrode structure from a thin, non-conducting substrate of porous structure, in particular from a sheet or felt of non-woven, interlocking fibres or a porous tissue. This felt may, for example, be based on polyvinyl chloride, polypropylene or the polyacrylamide known under the trademark NYLON.

The first essential step of the procedure described thus consists in first constructing the current collector by electroplating, preferably with nickel, this collector then forming a surface which is itself porous, closely moulding the extended surface of the substrate and penetrating into the three-dimensional space of the porous substrate. If required, the initial, porous substrate made of organic fibres can be removed by thermal oxidation. This first phase is then followed by a second phase which entails the deposition of nickel hydroxide-based active material in the three-dimensional bulk of the collector.

More particularly, a manufacturing process for a positive electrode structure of this type comprises the immersion of the highly porous collector in an electrolyte solution, of nickel nitrate in particular, and electrochemical impregnation in the interior of the porous collector in order to bring about in the pores of the latter the deposition of nickel hydroxide which will constitute the active material of the electrode, this electrochemical operation being regulated in a manner so as to permit only partial filling of the pores of the collector with the active material.

It will be profitable to refer to the French patent mentioned above or to the corresponding U.S. Pat. No. 4,356,242 for further details relating to the construction and performance of such electrode structures, as well as to French patent No. 84,0110.

Moreover, it is a known practice designed to improve certain properties of the nickel electrodes manufactured from collectors of the sintered type (improvement of the stability of the electrode during the cycling operations, limitation of the variations of volume during cycling, improved propensity to charging at high temperature or at low charging loads), to introduce into the impregnating solution of active material relatively low amounts of cobalt nitrate (for example, 5% of cobalt with respect to the nickel content). In other words, the nickel hydroxide-based active material deposited thus contains a low amount of cobalt hydroxide distributed in a homogeneous manner throughout its bulk. Although the presence of nickel hydroxide really does confer on nickel electrodes of the sintered type improved properties mentioned above, up to the present it has never been observed that the effect of cobalt is to increase the bulk capacity and, in a general manner, the energetic yield of the electrode of the type under consideration.

The invention results from the discovery that the incorporation of cobalt into the active material under appropriate conditions can, nonetheless, lead to a preceptible increase, which may be as high as 20% to 25%, of the bulk capacity of the nickel hydroxide-based electrodes constructed from collectors such as those described in the earlier patents cited above, and more especially of the non-woven fibrous support type and of the isotropic, cross-liked type with open porosity.

In order to attain the appropriate conditions mentioned above, the invention proposes the subdivision of the operation of electrochemical impregnation with nickel hydroxide mentioned above of the porous collector which had first been constructed into at least two distinct, successive steps separated by a non-electrochemical impregnation of the electrode structure partially impregnated with active material interposed at the end of the first of the two steps mentioned and which entails the use of a concentrated solution of cobalt nitrate ("doping" bath) containing notably 100 to 1,000 g/l but preferably 200 to 800 g/l, of cobalt nitrate or a salt equivalent in the sense of its being capable of being reduced to cobalt hydroxide at the second step of the electrochemical impregnation.

The process according to the invention consequently implies that the partially impregnated electrode is withdrawn from the electrochemical impregnation bath containing nickel hydroxide and dried at least roughly before being placed in the non-electrochemical impregnation bath (doping) containing the cobalt salt, the electrode, partially impregnated with nickel hydroxide and modified by chemical impregnation being then reintroduced into the electrolytic bath in order to effect the second stage of the electrochemical impregnation by means of nickel hydroxide which is essential to the manufacture of the final products.

Advantageously, the first step of the electrochemical impregnation is regulated so that the quantity of nickel hydroxide deposited in the pores in the interior of the collector amounts to about 70% to about 90% of the final or desired quantity of nickel hydroxide in the structure of the electrode, the remaining 30% to 10% of nickel hydroxide being then deposited during the second stage of the electrochemical impregnation.

The non-electrochemical impregnation of the partly finished electrode by means of a solution of a cobalt salt which can subsequently be transformed into cobalt hydroxide, particularly during the second step mentioned above, may be carried out in any appropriate manner: immersion of the partly finished electrode in a concentrated solution of the salt, cobalt nitride in particular, spraying of the partially impregnated electrode with a concentrated solution of cobalt salt, application by means of a buffer, etc. . . . The non-electrochemical impregnation operation (doping), in particular its duration in relation to the concentration of salt used, is conducted in such a manner as to incorporate into the electrode a final quantity of cobalt in the form of cobalt hydroxide, for example, which varies between about 2% and about 10%, and is more advantageously of the order of 4% to 6%, for example of final cobalt hydroxyde with respect of a concentration of nickel hydroxide in the final electrode.

The entire procedure which has just been outlined is advantageously carried out starting from a collector of high porosity, for example, of a non-woven fibrous type or of an isotropic, cross-linked type of open porosity, the pores of which have diameters of from 3 to 100, and in particular from 15 to 100 microns, the two steps of the electrochemical impregnation being so regulated that the final amount of active material deposited at the end of the second electrochemical impregnation step occupies about 45% to 65% and in particular 55% to 60% of the initial volume of the pores of the porous collector initially employed.

The different steps of the process described in the foregoing can be carried out by known procedures. For the details relating to them reference may again be made to the earlier patents. In addition and as an example, mention will be made of the procedure described by Kanigene for carrying out the electroplating of the initial, felt-based or fibre-based porous substrate and the procedure of Kandler for carrying out the steps of electrochemical impregnation, for example such as that described in the published German patent application 1,133,422 or in the Swiss patent 389,699.

Preferred experimental conditions will be outlined below which are applicable for the preparation of the improved electrodes according to the invention:

Nature of the doping bath:
Solutions presently used contains 50 g/l of cobalt nitrate. Depending on the Co content desired, this concentration may be varied between 200 and 800 g/l.

Temperature of the doping bath:
May vary between ambient temperature and 45° C.

Time: Very short—less than 1 mn.

Impregnation by the doping solution may be carried out either by immersion or by spraying or by means of a buffer.

The operation is carried out between the two electrochemical impregnations in nickel hydroxide, on electrodes which have been rinsed and dried.

The electrode impregnated by the solution of cobalt nitrate is immersed in an unstirred electrochemical impregnation bath and the voltage is applied as soon as possible (ideally, immersion takes place with the voltage applied).

The amount of nickel hydroxide deposited in the electrode at the time of doping amounts to between 70% and 90% of the final quantity.

At least the initial phase of the second electrochemical impregnation (following doping) is carried out in the absence of agitation in order to prevent a too large dilution in the bath of the cobalt salts which must be fixed in the electrode.

It will be observed that the most favourable results are obtained when a collector of high porosity of the felt type is used for the manufacture of the positive electrodes according to the invention. Nonetheless, very much higher mass yields are also obtained with electrodes constructed from collectors of high porosity of the isotropic, cross-liked type of open porosity, even though the increase of mass capacity does not attain the 20% to 25% supplementary capacity which can be obtained with the electrodes manufactured from porous felts.

It is also striking that the increase in mass capacity appears to be due to the heterogeneity of the distribution of cobalt within the active material deposited in the interior of the fibrous support of high porosity which constitutes the current collector. In fact, the increase in mass capacity which the invention makes possible is not observed on completion of the standard process of electrochemical impregnation carried out in a single step, and employing from the beginning a nickel nitrate-based electrolyte solution containing a proportion of cobalt nitrate corresponding to a final concentration of cobalt hydroxide which is about 5% of the final concentration of nickel hydroxide.

This micro-heterogeneity can be detected by any appropriate means, for example with the aid of a microprobe of Castaing.

In this respect, the invention thus relates to the new products which are constituted by the structures of the positive electrode, the active material of which is constituted by nickel hydroxide within which the active cobalt, particularly in the form of cobalt hydroxide, is dispersed in a heterogeneous manner, the collector being of high porosity, in particular of the non-woven fibrous type or of the isotropic, cross-linked type of open porosity.

In particular, the invention relates to the structures of the type mentioned above in which the innermost part in direct contact with the collector, the thickness of the plating which is formed by the active material and which binds directly to the porosities of the current collector, is essentially free of cobalt. In particular, it can be observed that the major portion of the cobalt thus incorporated into the plating is dispersed in a region occupying approximately the mid-position in the thickness of the plating.

In particular, the major portion of the cobalt present, for example the cobalt present as the hydroxide in the order of 2% to 10%, and particularly from 4% to 6%, of the nickel hydroxide present is concentrated in approximately the median position of the plating.

In order words, the electrode according to the invention may be characterized as possessing, within the plating of active material itself and more particularly in their median zones, zones of microvolume (for example, of the order of $1-10\mu^3$) in which cobalt hydroxide predominates over nickel hydroxide.

Preferred structures of the invention may be characterized as comprising a nickel-based metallic collector, the pores of which were initially 3 to 150, and in particular 15 to 100 microns in diameter, and in that the active material occupies 45% to 65%, and in particular 55% to 60%, of the initial total volume of these pores, and in that the thickness of the final structure of the electrode varies between about 0.1 and 4 millimeters. In particular, structure of appropriate electrodes will have thicknesses which vary between about 0.2 and 3 millimeters.

As will be obvious and as follows from the preceding discussion, the invention is in no way limited to those of its modes of application and construction which have been given more special consideration; on the contrary, it encompasses all possible variants; in particular, the invention relates to modified electrodes of this type in which the principal metal of the collector is a metal other than nickel, for example, copper.

Among the variants of the invention which constitute obvious equivalents of the structure and of the process claimed below, mention will be made of the structures obtained by procedures in which the operation of electrochemical impregnation is subdivided into more than two steps and into which are introduced several non-electrochemical impregnation steps using a cobalt salt under the conditions which have been described above. It will be obvious that the number of these steps must be limited, if only on account of the thinness of the electrode available and of the limited volume of the pores of the collector which is available for partial filling.

We claim:

1. A porous positive electrode for a liquid electrolyte, electrochemical generator, said electrode comprising:
   a porous metallic current collector; and
   an active material in pores of said collector comprising:
   a) a first layer of nickel hydroxide on said collector;
   b) a second layer of cobalt hydroxide on said first layer; and
   c) a third layer of nickel hydroxide on said second layer; wherein about 70 to 90% by weight of said nickel hydroxide of said active material being in said first layer and wherein further said cobalt hydroxide of said second layer is heterogeneously dispersed within both said first and third layers about said second layer.

2. The electrode of claim 1, wherein said collector comprises nickel metal.

3. The electrode of claim 2, wherein said collector is formed by electroplating nickel on a fabric substrate.

4. The electrode of claim 3, wherein said fabric substrate is a non-woven fabric or a fabric of isotropic cross-linked fibers.

5. The electrode of claim 2, wherein said active material in pores of said nickel collector is formed by a process comprising the following steps:
   1) electroplating nickel hydroxide on said nickel collector to form said first layer;
   2) then doping said first layer with a cobalt salt to form said second layer; and
   3) then electroplating additional nickel hydroxide on said cobalt salt to form said third layer and convert said cobalt salt to said cobalt hydroxide; about 70 to 90% by weight of said nickel hydroxide of said active material being electroplated on said nickel collector in step 1).

6. The electrode of claim 5, wherein said cobalt hydroxide is about 2% to 10% by weight of said active material.

7. The electrode of claim 5, wherein said cobalt hydroxide is 4% to 6% by weight of said active material.

8. The electrode of claim 6, wherein a majority of pores of said collector have diameters of 3 to 150 microns and said active material occupies 45% to 65% of the volume of said pores of said collector.

9. The electrode of claim 6, wherein a majority of pores of said collector have diameters of 15 to 100 microns and said active material occupies 55% to 60% of the volume of said pores of said collector.

10. The electrode of claim 9, which has a thickness of 0.1 to 4 millimeters.

11. The electrode of claim 5, wherein said first layer is doped in step 2) with said cobalt salt by either; a) immersing said nickel collector in a solution of said cobalt salt, or b) spraying said nickel collector with a solution of said cobalt salt.

12. The electrode of claim 5, wherein said cobalt hydroxide is not in direct contact with said collector.

13. The electrode of claim 12, wherein said second layer of said cobalt hydroxide is a microvolume of the order of $1-10\mu^3$ about the middle of the thickness of said active material, in which microvolume said cobalt hydroxide predominates over said nickel hydroxide.

14. A process for making the positive electrode of claim 12, comprising the following steps for providing said active material in pores of said collector; 1) electroplating nickel hydroxide on said collector to fill only partially pores of said collector; 2) then doping said nickel hydroxide with a cobalt salt; and 3) then electroplating additional nickel hydroxide on said collector; about 70 to 90% by weight of said nickel hydroxide of said active material being electroplated on said nickel collector in step 1).

15. The process of claim 14, wherein said collector comprises nickel metal.

16. The process of claim 15, wherein said collector is formed by electroplating nickel on a non-woven fabric or a fabric of isotropic cross-linked fibers.

17. The process of claim 16, wherein said nickel hydroxide is doped in step 2) with a solution containing 100 to 1,000 g/liter of a cobalt salt; and said cobalt salt is converted to cobalt hydroxide in step 3).

18. The process of claim 17, wherein said doping step 2) is carried out so that said active material contains about 2% to 10% by weight of said cobalt hydroxide.

19. The process of claim 17, wherein said doping step 2) is carried out so that said active material contains about 4 to 6% by weight of said cobalt hydroxide.

20. The process of claim 19, wherein said pores of said collector have diameters of 3 to 150 microns and said active material occupies 45% to 65% of the volume of said pores.

21. The process of claim 19, wherein said pores of said collector have diameters of 15 to 100 microns and said active material occupies 55% to 60% of the volume of said pores.

22. An electrochemical generator containing the positive electrode of claim 1.

23. An electrochemical generator containing the positive electrode of claim 2.

24. An electrochemical generator containing the positive electrode of claim 5.

25. An electrochemical generator containing the positive electrode of claim 8.

* * * * *